United States Patent Office 3,082,058
Patented Mar. 19, 1963

3,082,058
EVAPORATION-RETARDANT
Henri L. Rosano, 11 Colonial Court, River Edge, N.J.
No Drawing. Filed Aug. 7, 1957, Ser. No. 676,707
3 Claims. (Cl. 21—60.5)

The present invention relates generally to techniques and compositions adapted to reduce surface evaporation of liquids and more particularly to the effective retardation of evaporation in water reservoirs and the like in a manner which is both non-toxic and economical.

In arid and semi-arid regions the amount of water loss from reservoirs, lakes, ponds and open tanks as a result of surface evaporation frequently exceeds the amount beneficially used. This loss seriously hampers agricultural and industrial development, and adds materially to the problems of design and cost of water storage works. In some tropical areas, annual evaporation losses are reported to be as much as ten feet depth of water, while eight feet is the accepted value for many storage schemes.

During dry seasons, which may last for six months or more, evaporation rates are far greater than during the balance of the year. In many instances, water in reservoirs is exhausted before the end of the dry season, and either the local population is compelled to migrate, or water has to be brought in at great cost by road, rail or sea from distant sources of supply. Cases have occurred in remote areas in which the drying up of water supplies has given rise to heavy losses of camels, cattle and other live stock, and sometimes of human lives.

In addition to the particular problem existing in arid areas, there is the general problem of an acute universal water shortage. This comes about in part from the tremendous and continuing increase in world population coupled with rising individual water requirements which accompany an increase in the standard of living. Thus, in the United States, an industrialized country with a high standard of living, the water requirements of each individual citizen are calculated to be 1500 gallons per day. The water requirements involved in the production of several vital products are listed in the following table.

| Products produced: | Water requirement, gallons |
|---|---|
| 1 ton of steel | 40,000 |
| 1 gallon of gasoline | 10 |
| 1 gallon of beer | 8 |
| 1 slice of bread | 37.5 |

The distribution of the total needs of the U.S.A. (275 billions gallons of water per day, in 1957), has been estimated as follows:

Less than 10% for domestic purposes
33% for irrigation
More than 50% for industry It has been estimated that 50–70% of the total rainfall received by the United States is lost by evaporation. The reduction of even a small fraction of the evaporation losses would therefore be of incalculable value. Hydraulic engineers have in the past made various proposals to this end, but these have proved to be either impracticable or excessively costly. It has heretofore been proposed to add certain chemicals to bodies of water to reduce surface evaporation. In this connection the use of a monomolecular film of cetyl alcohol for restricting evaporation has been studied in laboratories for many years, but the application of this knowledge to reservoirs appears to be a recent development on which work is in progress in several countries. The growing need for water for drinking purposes, irrigation and in industrial processes is such as to make the problem of water evaporation one of major importance internationally.

It is apparent that in adding any such chemical compounds to bodies of water to prevent surface evaporation, in order to be successfully employed, the compound must be harmless to both animals and plants. Moreover, the compounds much be such that the surface evaporation can be prevented at relatively low cost. It has been found that the long chain, normally solid, aliphatic alcohols, particularly the normally solid alkanols, if they are suitably dispersed on the surface of water, will form a monomolecular film effective to materially retard surface evaporation. Such materials as myristyl, cetyl and stearyl alcohols are especially desirable in this respect. The problem presented by these materials, however, is one of satisfactory dispersion of the alcohol on the surface to obtain the necessary monomolecular layer.

At room temperature, small particles of pure cetyl alcohol ($CH_3(CH_2)_{15}OH$), M.W. 244, M.P. 49.3° C., deposited on plain water surface do not give a monolayer. This can be seen by depositing a small piece of cetyl alcohol on a clean surface of water covered with talcum powder at room temperature. The talcum powder is not pushed away, thereby showing that the cetyl does not spread. In order to obtain a monolayer it is necessary to combine with the cetyl alcohol a substance which will allow the spreading of the substance. The substance to be mixed to the long chain fatty alcohol, or mixture of long chain fatty alcohols, must have the following properties:

(a) It is compatible with the alcohol (or mixture).
(b) It is non-toxic.
(c) It has a high pressure of spreading.
(d) It does not give a mixed film with the fatty alcohol.
(e) It is removed from the insoluble monolayer by the water.

In accordance with the present invention, it has been discovered that solid, long chain, aliphatic alcohols having 14 to 18 carbon atoms, such as myristyl, cetyl or stearyl alcohols, or mixtures thereof, may be dispersed on the surface of water by application from solution (solid or liquid state) in a branched chain, aliphatic alcohol having 6 to 8 carbon atoms. For the purpose of this invention, the branched chain alcohols include primary alcohols having a branched alkyl radical, secondary and/or tertiary alcohols, and particularly those having alkyl radicals. Such alcohols include 2-ethyl hexanol, 2-hexanol, 4-heptanol 2-methyl, 2-pentanol, 3-ethyl pentanol, 2-ethyl 1-butanol, etc.

In order to obtain the necessary dispersion and a resulting monomolecular layer which will reduce evaporation, it is essential to employ a branched alcohol to the exclusion of a straight chain alcohol as a dispersing agent. The straight chain alcohols are in general unsatisfactory as dispersants since they become physically enmeshed in the alcohol monolayer and thus produce a permeable monolayer.

At 25° C., in order to obtain satisfactory rapid dispersal of the solid alcohol, 50% by weight of branched chain, aliphatic alcohol having from 6 to 8 carbon atoms is employed for the solid, aliphatic alcohol having 14 to 18 carbon atoms. Generally, the relative amounts of solid alcohol and branched alcohol are sufficient to provide a liquid solution of the two.

Monolayer spread on the surface of water can exist in different physical states: gaseous, liquid expanded, liquid condensed, solid. The liquid condensed state has been found the more effective in reducing the rate of evaporation of water. For a given surface concentration of the molecule contained in the monolayer, the higher the temperature of the water, the more expanded will be the state of the monolayer. On the other hand, the longer the chain of long chain fatty alcohol, the greater will be the tendency to give condensed monolayer. Consequently the alcohol to be used will be determined by the temperatures of application. With respect to the concentration of dispersant to be used, we have found that the shorter the chain is, the higher the spreading surface pressure.

By mixing the two substances, it is evident that the greater is the amount of impurity, the weaker will be the crystalline structure. The higher the temperature of the water, the weaker will be the crystalline structure. Hence, the desirable amount of branched aliphatic alcohol to and to the fatty alcohol (or mixture) must be determined by taking into account all these factors.

Another important aspect of the invention is the application of the evaporation retardant to the formulation of insecticide, algicide, etc., compositions to be spread on water surfaces. The same principles described in this invention can also be applied to long chain fluoride compounds ($CF_3(CF_2)_nOH$ for example). But in that case, these substances spread on gasoline surface give too much condensed monolayers. Addition of branched derivatives have been found to give very promising results in reducing the rate of evaporation of gasoline. Concerning the effect of wind on spreading of our mixtures at 25° C., it was observed that all these mixtures submitted to a current of air of roughly 6 m.p.h. show immediate recovery characteristics.

I have tested two different samples of $C_{18}$ alcohol and have found 35.7% and 35.0% reduction of evaporation of water at 21° C. These two samples were very pure. The percent reduction to evaporation of water of several mixtures of $C_{16}$ and $C_{18}$ long chain alcohols has been determined.

| Percent | | Percent reduction |
|---|---|---|
| $C_{16}$ | $C_{18}$ | |
| 100 | 0 | 35.7 |
| 80 | 20 | 58.0 |
| 60 | 40 | 52.0 |
| 50 | 50 | 68.5 |
| 40 | 60 | 54.5 |
| 20 | 80 | 42.0 |
| 0 | 100 | 24.9 |

It can be seen from these experiments that 1–1 and 2–1 mixtures give better results than pure $C_{18}$ or pure $C_{16}$ fatty alcohols.

Having in the foregoing provided a general description of the invention, the following examples are now given for more specific illustration of various embodiments thereof:

Example I

A solution was formed from equal parts by weight of a mixture of two parts stearyl alcohol and one part cetyl alcohol and 2-ethyl hexanol. The resulting solution was applied to a test water surface of known dimensions in an amount sufficient to obtain a monomolecular layer. Prior to addition of the solution, talcum powder was dusted evenly over the water surface. The solution was then added near the center of the test surface. From the rapid movement of the talcum powder from the center to the edges of the test surface it was determined that the 2-ethyl hexanol effected a rapid dispersion of the tallow alcohol mixture on the surface of the water. The evaporation rate was then measured and it was determined that a reduction in surface evaporation of 44.9% was obtained as a result of the monomolecular layer of solid alcohols on the surface of the water.

Example II

The tests of Example I were repeated except for the substitution of 2-hexanol for 2-ethyl hexanol. Rapid dispersion was again observed and a reduction evaporation of 57.7% was obtained.

Example III

A solution was formed from equal parts by weight of stearyl alcohol and 2-ethyl hexanol. The surface evaporation in grams for a test water surface of known dimensions was measured over a period of time as indicated below, whereupon sufficient of the alcohol-dispersant solution was added to produce a monomolecular layer on the surface. The data presented in tabular form indicate the surface evaporation rate both before and after addition of the stearyl alcohol-ethyl hexanol solution.

| Times in minutes: | Evaporation in grams |
|---|---|
| 8 | .24 |
| 15 | .42 |
| 44 | 1.19 |
| 53 (solution added) | 1.42 |
| 58 | 1.51 |
| 68 | 1.70 |
| 90 | 2.1 |

It will be seen that after the addition of the stearyl alcohol solution a retardation of surface evaporation of 35.7% was obtained.

Example IV

A test similar to that of Example III was conducted, this time employing a 2:1 mixture of stearyl and cetyl alcohols dissolved in an equal part by weight of 2-ethyl hexanol. The solution was added to the water at the end of 28 minutes. The following results were obtained.

| Time in minutes: | Evaporation in grams |
|---|---|
| 14 | .51 |
| 21 | .76 |
| 28 (solution added) | .94 |
| 52 | 1.28 |

A reduction in evaporation of 58.33% was obtained.

Example V

A test similar to that of Example III was conducted in which a 3:2 mixture of stearyl and cetyl alcohols were admixed with an equal part of 2-ethyl hexanol. The solution was added to the water at the end of 40 minutes. The following results were obtained.

| Time in minutes: | Evaporation in grams |
|---|---|
| 14 | .42 |
| 21 | .62 |
| 34 | 1.0 |
| 40 (solution added) | 1.13 |
| 54 | 1.36 |
| 67 | 1.52 |
| 70 | 1.56 |
| 80 | 1.7 |

A reduction in evaporation of 51.7% was achieved.

Example VI

A test similar to that of Example III was conducted, employing a solution of a mixture of 2 parts stearyl alcohol and 3 parts cetyl alcohol in an equal portion by weight of 2-ethyl hexanol. The solution was added to the water at the end of 15 minutes. The following results were obtained.

| Time in minutes: | Evaporation in grams |
|---|---|
| 7 | .32 |
| 11 | .45 |
| 14 | .6 |
| 15 (solution added) | .64 |
| 32 | 1.0 |
| 43 | 1.2 |
| 61 | 1.52 |

A 54.65% evaporation retardation was obtained.

Example VII

A further test was conducted similar to that of Example III in which a 1:1 mixture of stearyl alcohol and cetyl alcohol was dissolved in an equal amount by weight of 2-ethly hexanol. This solution was added to the water at the end of 18 minutes. The following results were obtained.

| Time in minutes: | Evaporation in grams |
|---|---|
| 9 | .36 |
| 15 | .60 |
| 18 (solution added) | .68 |
| 24 | .78 |
| 36 | .98 |
| 43 | 1.1 |
| 49 | 1.18 |

A reduction in evaporation of 68.75% was thus obtained.

It will be seen from the foregoing examples that by employing as dispersing agents liquid branched chain, aliphatic alcohols having from 6 to 8 carbon atoms in accordance with the invention, solid, long chain, aliphatic alcohols having from 14 to 18 carbon atoms may be rapidly spread in a monomolecular layer upon water surfaces and a materially reduced surface evaporation may be obtained.

What is claimed is:

1. A composition comprising equal parts by weight of a mixture consisting of about 0.66 to 2 parts of stearyl alcohol and 1 part of cetyl alcohol and of a branch chain alkanol containing 8 carbon atoms.

2. The composition of claim 1 wherein the alkanol is 2-ethyl hexanol.

3. The method of reducing evaporation losses from a body of water which comprises adding thereto a solution of about 0.66 to 2 parts of stearyl alcohol and 1 part of cetyl alcohol in a branch chained alkanol containing 8 carbon atoms to form a monomolecular layer of stearyl and cetyl alcohols on the surface of the water.

References Cited in the file of this patent

Sbba et al.: J. Chem. Soc., January-June 1940, pp. 106–114.

Mansfield: "Influence of Monolayers on the Natural Rate of Evaporation of Water," Nature, Feb. 5, 1955, pp. 247–249.

Laycock: "Cetyl Alcohol Controls Evaporation," Water and Sewage Works, August 1956.

Gregory: "Uses and Applications of Chemicals and Related Materials," vol. II, Reinhold Publishing Corp., New York, N.Y., pp. 236–237.